(12) United States Patent
Guen (10) Patent No.: US 8,668,998 B2
(45) Date of Patent: Mar. 11, 2014

(54) SECONDARY BATTERY (75) Inventor: Minhyung Guen, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 212 days.

(21) Appl. No.: 13/064,582

(22) Filed: Apr. 1, 2011

(65) Prior Publication Data

US 2012/0196160 A1 Aug. 2, 2012

Related U.S. Application Data (60) Provisional application No. 61/437,988, filed on Jan. 31, 2011.

(51) Int. Cl.
*H01M 2/12* (2006.01)
*H01M 2/00* (2006.01)

(52) U.S. Cl.
USPC ............................................ 429/56; 429/163

(58) Field of Classification Search
USPC ................. 429/56, 94, 160–163, 175–177
See application file for complete search history.

(56) References Cited

U.S. PATENT DOCUMENTS

| | | | |
|---|---|---|---|
| 6,204,635 B1 | 3/2001 | Sullivan | |
| 6,838,207 B1 | 1/2005 | Sugita | |
| 2002/0012829 A1* | 1/2002 | Yamahira et al. | 429/56 |
| 2006/0024568 A1* | 2/2006 | Lee | 429/130 |
| 2006/0051664 A1* | 3/2006 | Tasai et al. | 429/161 |
| 2006/0172192 A1 | 8/2006 | Berkowitz et al. | |
| 2007/0172722 A1* | 7/2007 | Nishide et al. | 429/53 |
| 2009/0186269 A1* | 7/2009 | Kim et al. | 429/179 |
| 2010/0068616 A1 | 3/2010 | Uh | |
| 2011/0117402 A1* | 5/2011 | Kim et al. | 429/94 |

FOREIGN PATENT DOCUMENTS

| | | |
|---|---|---|
| EP | 0-959-508 A1 | 11/1999 |
| EP | 1-821-355 A2 | 8/2007 |
| EP | 2362461 A1 | 8/2011 |
| JP | 2000-011989 A | 1/2000 |
| JP | 2000-223109 | 8/2000 |
| JP | 2000-277081 A | 10/2000 |
| JP | 2007-200620 A | 8/2007 |
| KR | 10-2007-0025687 A | 3/2007 |
| KR | 10-2009-0081197 A | 7/2009 |
| KR | 10-2010-0032657 A | 3/2010 |

OTHER PUBLICATIONS

Korean Notice of Allowance dated Oct. 29, 2012.
European Office Action dated Apr. 5, 2012.
European Office Action dated Aug. 29, 2013.
Japanese Office Action dated May 21, 2013.

* cited by examiner

*Primary Examiner* — Patrick Ryan
*Assistant Examiner* — Muhammad Siddiquee
(74) *Attorney, Agent, or Firm* — Lee & Morse, P.C.

(57) ABSTRACT

A rechargeable battery includes an electrode assembly, a case accommodating the electrode assembly, a cap plate sealing an opening in the case, and electrode terminals extending through the cap plate at opposite ends of the cap plate. The cap plate includes a recessed portion extending in one direction between the electrode terminals.

17 Claims, 12 Drawing Sheets

SECONDARY BATTERY

CROSS-REFERENCE TO RELATED APPLICATION

The present application claims priority under 35 U.S.C. §119(e) to U.S. Provisional Application No. 61/437,988, filed on Jan. 31, 2011, and entitled: "Secondary Battery," which is incorporated herein by reference in its entirety.

BACKGROUND

1. Field

Embodiments relate to a secondary battery.

2. Description of the Related Art

Secondary batteries are rechargeable unlike primary batteries. Among such secondary batteries, a low capacity battery including a battery cell in the form of a pack may be used for small portable electronic devices such as cellular phones and camcorders, and a high capacity battery including dozens of battery cells connected to one another may be used as a motor-driving power source for electric scooters, hybrid vehicles, or electric vehicles.

Secondary batteries are manufactured in various shapes such as a cylindrical shape and a pouch shape. A secondary battery includes an electrode assembly formed by disposing an insulating separator between a positive electrode plate and a negative electrode plate, a case in which the electrode assembly is accommodated together with electrolyte, and a cap plate used to close the case. The electrode assembly is connected to terminals penetrating the cap plate and protruding outward.

SUMMARY

According to at least one embodiment, there is provided a rechargeable battery including an electrode assembly, a case accommodating the electrode assembly, a cap plate sealing an opening in the case, and electrode terminals extending through the cap plate at opposite ends of the cap plate, the cap plate including a recessed portion extending in one direction between the electrode terminals.

The recessed portion may extend from a top surface of the cap plate toward the electrode assembly.

The cap plate may have a planar area, more than half of the planar area being occupied by the recessed portion.

The recessed portion may include a bottom portion and connection portions connecting the recessed portion to the top surface of the cap plate.

The recessed portion may include rounded portions between the bottom portion and the connection portions.

The electrode assembly may include a convex outer portion that faces the cap plate.

The bottom portion of the recessed portion of the cap plate may be planar.

The bottom portion of the recessed portion of the cap plate may have a convex shape corresponding in shape to the convex outer portion of the electrode assembly.

The bottom portion of the recessed portion of the cap plate may include a safety vent.

The rechargeable battery may further include an impact damper between the recessed portion of the cap plate and the electrode assembly, wherein the impact damper is attached to a surface of the recessed portion of the cap plate facing the electrode assembly.

The impact damper may include an elastomer.

The impact damper may include perfluoroalkoxy (PFA), polypropylene (PP), or polyethylene (PE).

The electrode assembly may include two or more electrode assembly units, each electrode assembly unit including a convex upper portion facing the cap plate.

The bottom portion of the recessed portion of the cap plate may be planar.

The bottom portion of the recessed portion of the cap plate may include two or more convex portions, each convex portion corresponding in shape to one of the convex outer portions of the electrode assembly units. The bottom portion of the recessed portion of the cap plate may include a rounded protrusion extending downwardly from each convex portion and towards a cleft between the convex upper portions of the electrode assembly units.

According to at least one embodiment, there is provided a rechargeable battery including a case having a pair of oppositely disposed wide sides, oppositely disposed narrow sides, a top side, and a bottom side opposite to the top side, the wide sides extending longitudinally in a first lateral direction between the narrow sides, an electrode assembly in the case, a cap plate at the top side of the case, the cap plate including a first part disposed in a plane of the top side of the case and a second part spaced from the first part toward the electrode assembly in a second direction perpendicular to the first direction, the second part being elongated and extending longitudinally in the first lateral direction.

The rechargeable battery may further include a first terminal that includes a first collecting plate that contacts an end of the electrode assembly and a first collecting terminal that extends downwardly from the first part of the cap plate to contact the first collecting plate, the first collecting terminal being disposed entirely above the electrode assembly, the bottom portion of the second part of the cap plate being spaced from the first part of the cap plate by a greater distance than a distance that the first collecting terminal extends downwardly from the first part of the cap plate.

The rechargeable battery may further include a second terminal spaced in the first lateral direction from the first terminal, the second part being between the first terminal and the second terminal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 1A:
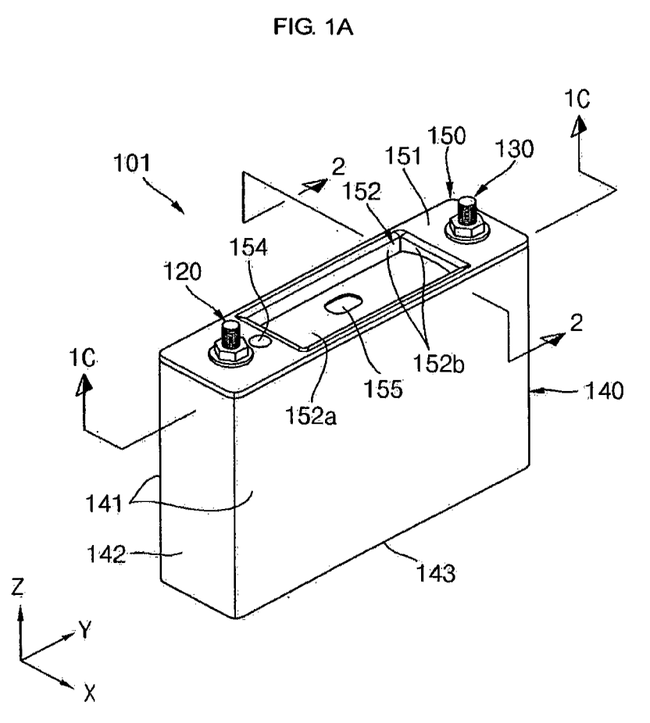
FIGS. 1A and 1B illustrate perspective view relating to a secondary battery according to an embodiment.
Figure 1B:
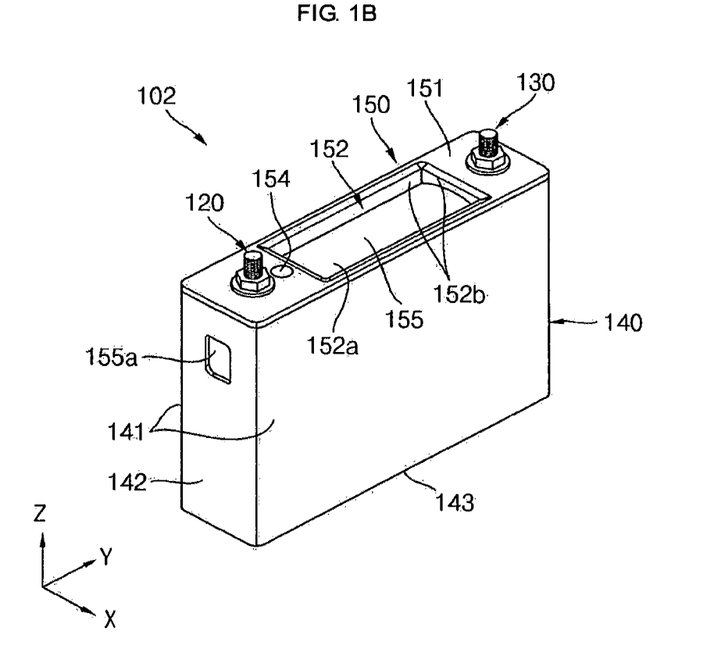
Figure 1C:
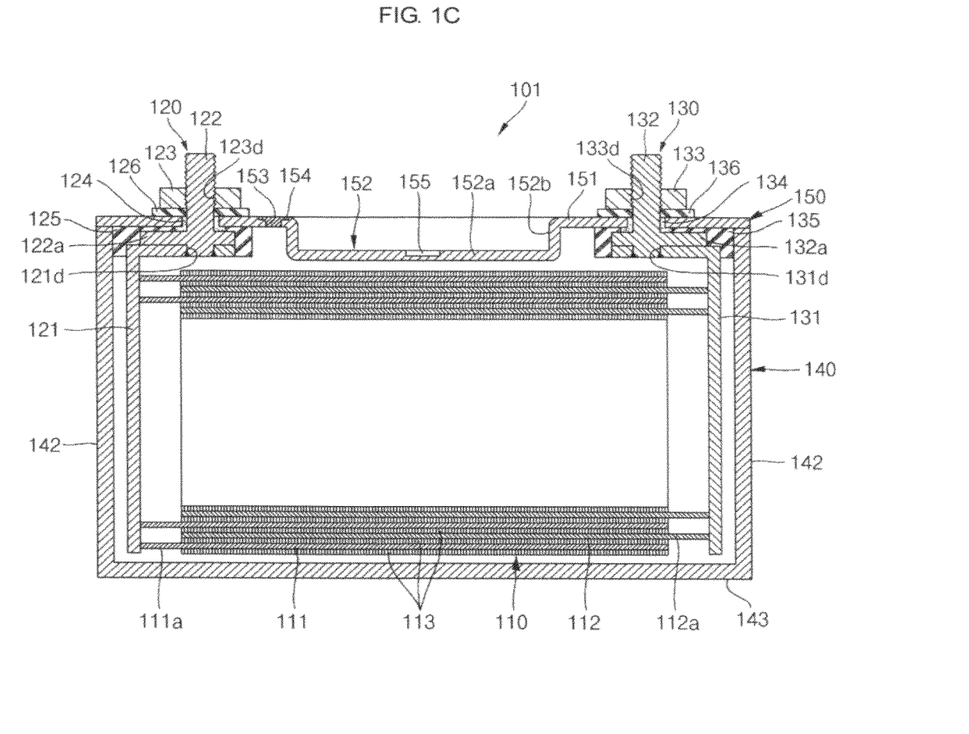
FIG. 1C is a sectional view taken along line 1C-1C of FIG. 1A.

FIGS. 1A and 1B are perspective views illustrating a secondary battery 101 (102) according to an embodiment, and FIG. 1C is a sectional view taken along line 1C-1C of FIG. 1A.

Referring to FIGS. 1A through 1C, the secondary battery 101 (102) of the current embodiment includes an electrode assembly 110, a first terminal 120, a second terminal 130, a case 140, and a cap plate 150.

The electrode assembly 110 includes a first electrode plate 111, a separator 113, and a second electrode plate 112, which may have a thin plate or film shape. The electrode assembly 110 may be formed by winding the above-listed parts in a jelly-roll type or by stacking the parts. The first electrode plate 111 may function as a negative electrode, and the second electrode plate 112 may function as a positive electrode. Alternatively, the first electrode plate 111 and the second electrode plate 112 may function oppositely.

The first electrode plate 111 may be formed by applying a first electrode active material such as graphite or carbon to a first electrode collector formed of metal foil such as nickel or copper foil. The first electrode plate 111 may include a first electrode non-coating portion 111a to which the first electrode active metal is not applied. The first electrode non-coating portion 111a may function as a current flow passage between the first electrode plate 111 and the first terminal 120. In the current embodiment, materials that can be used to form the first electrode plate 111 are not limited to the above-mentioned materials.

The second electrode plate 112 may be formed by applying a second electrode active material such as a transition metal oxide to a second electrode collector formed of metal foil such as aluminum foil. The second electrode plate 112 may include a second electrode non-coating portion 112a to which the second electrode active metal is not applied. The second electrode non-coating portion 112a may function as a current flow passage between the second electrode plate 112 and the second terminal 130. In the current embodiment, materials that can be used to form the second electrode plate 112 are not limited to the above-mentioned materials.

The polarities of the first and second electrode plates 111 and 112 may be reversed.

The separator 113 may be disposed between the first electrode plate 111 and the second electrode plate 112 to prevent a short circuit between the first and second electrode plates 111 and 112. Lithium ions can move through the separator 113. The separator 113 may be formed of a polyethylene film, a polypropylene film, or a film including polyethylene and polypropylene. In the current embodiment, materials that can be used to form the separator 113 are not limited to the above-mentioned materials.

The first and second terminals 120 and 130 may be disposed at respective sides of the electrode assembly 110 and may be electrically connected to the first and second electrode plates 111 and 112, respectively.

The electrode assembly 110 may be accommodated in the case 140 together with electrolyte. The electrolyte may include an organic solvent such as ethylene carbonate (EC), propylene carbonate (PC), diethyl carbonate (DEC), ethyl methyl carbonate (EMC), or dimethyl carbonate (DMC); and a lithium salt such as $LiPF_6$ or $LiBF_4$. The electrolyte may be liquid, solid, or gel.

The first terminal 120 may be formed of a metal, or an equivalent thereof, and is electrically connected to the first electrode plate 111. The first terminal 120 may include a first collecting plate 121, a first collecting terminal 122, and a first coupling terminal 123. In addition, the first terminal 120 may further include a seal gasket 124 disposed between the first collecting terminal 122 and the cap plate 150. The seal gasket 124 electrically insulates the first collecting terminal 122 and the cap plate 150 from each other and prevents leakage of the electrolyte and permeation of moisture. In addition, the first terminal 120 may further include a lower insulator 125 disposed between the first collecting terminal 122 and the cap plate 150 for electric insulation therebetween. In addition, the first terminal 120 may further include an upper insulator 126 disposed between the first coupling terminal 123 and the cap plate 150 for electrical insulation therebetween.

The first collecting plate 121 contacts the first electrode non-coating portion 111a, which protrudes from an end of the electrode assembly 110. The first collecting plate 121 may be welded to the first electrode non-coating portion 111a. The first collecting plate 121 may have an approximately reverse L-shape, and a terminal hole 121d may be formed in the upper portion of the first collecting plate 121. A lower part of the first collecting terminal 122 may be fitted and coupled to the terminal hole 121d. For example, the first collecting plate 121 may be formed of copper or a copper alloy. However, the material of the first collecting plate 121 is not limited thereto.

The first collecting terminal 122 penetrates the cap plate 150 (described below) and may protrude upwardly by a predetermined length. The first collecting terminal 122 may be electrically connected to the first collecting plate 121 at the lower side of the cap plate 150. The first collecting terminal 122 may extend and protrude upward from the cap plate 150 by a predetermined length. The first collecting terminal 122 may include a flange 122a at a position under the cap plate 150 so that the first collecting terminal 122 cannot be separated from the cap plate 150. A part of the first collecting terminal 122 lower than the flange 122a may be inserted in the terminal hole 121d of the first collecting plate 121 and may be coupled thereto by riveting or welding. In addition, a plurality of threads may be formed on a part of the first collecting terminal 122 higher than the flange 122a for coupling with the first coupling terminal 123. For example, the upper part of the first collecting terminal 122 may be coupled to the first coupling terminal 123 (described below) by a bolt-nut coupling method. For example, the first collecting terminal 122 may be formed of one of copper, copper alloy, and an equivalent thereof. However, the material of the first collecting terminal 122 is not limited thereto.

The first coupling terminal 123 may have a hexagonal nut shape, and a threaded penetration hole 123d may be formed through the center of the first coupling terminal 123 so that the first collecting terminal 122 can be inserted and coupled with the first coupling terminal 123. The first coupling terminal 123 may be formed of one of stainless steel, copper, copper alloy, aluminum, aluminum alloy, and an equivalent thereof. However, the current embodiment is not limited to such materials.

The second terminal 130 may be formed of a metal or an equivalent thereof, and is electrically connected to the second electrode non-coating portion 112a of the second electrode plate 112. The second terminal 130 may include a second collecting plate 131, a second collecting terminal 132, and a second coupling terminal 133. The second terminal 130 may have the same shape and structure as that of the first terminal 120. Thus, the shape and structure of the second terminal 130 will not described again. The second collecting plate 131 and the second collecting terminal 132 may be formed of one of aluminum, an aluminum alloy, and an equivalent thereof. However, the current embodiment is not limited to such materials. The second coupling terminal 133 may be formed of one of stainless steel, aluminum, aluminum alloy, copper, copper alloy, and an equivalent thereof. However, the current embodiment is not limited thereto.

The second coupling terminal 133 may be electrically connected to the cap plate 150. In this case, the case 140 and the cap plate 150 (that will be described below in detail) may have the same polarity (for example, positive polarity) as that of the second terminal 130.

In FIG. 1C, reference numerals 134, 135, and 136 denote a seal gasket, a lower insulator, and an upper insulator, respectively. In addition, reference numeral 131d denotes a penetration hole formed through the second collecting plate 131, reference numeral 132a denotes a flange formed on the second collecting terminal 132, and reference numeral 133d denotes a threaded penetration hole formed through the second coupling terminal 133.

The first terminal 120 and the second terminal 130 may have other structures instead of the above-described structures. That is, the current embodiment is not limited thereto the above-described structures of the first and second terminals 120 and 130.

The case 140 may be formed of a conductive metal such as aluminum, aluminum alloy, or steel plated with nickel, and may have an approximately hexahedron shape with an opening, so that the electrode assembly 110, the first terminal 120, and the second terminal 130 can be inserted and placed in the case 140. The case 140 may include relatively wide sides 141 facing each other, relatively narrow sides 142 facing each other and connected to the wide sides 141, and a bottom side 143 connecting the wide sides 141 and the narrow sides 142. A side opposite to the bottom side 143 is open. FIG. 1C illustrates a state where the case 140 and the cap plate 150 are coupled to each other, and the opened side of the case 140 is not shown. However, the peripheral part of the cap plate 150 substantially corresponds to the opened side of the case 140. The inner surface of the case 140 may be treated to be electrically insulated from the electrode assembly 110, the first and second terminals 120 and 130, and the cap plate 150.

The cap plate 150 is coupled to the case 140. The cap plate 150 may be coupled to the case 140 by welding. In detail, the cap plate 150 may include an upper portion 151 that is welded to upper ends of the wide sides 141 and the narrow sides 142, and a recessed portion 152 that bends to extend from the upper portion 151 toward the electrode assembly 110 by a predetermined depth. The upper portion 151 may include a planar top surface. The cap plate 150 may have a rectangular plate shape with a central recess portion 152.

As another way of describing the secondary battery, the case 140 may include a pair of oppositely disposed wide sides 141, oppositely disposed narrow sides 142, a top side, and a bottom side 143 opposite to the top side, the wide sides 141 extending longitudinally in a first lateral direction between the narrow sides 142. The cap plate 150 may be at the top side of the case 140 and may include a first part 151 disposed in a plane of the top side of the case 140 and a second part 152 spaced from the first part 151 toward the electrode assembly 110 in a second direction perpendicular to the first direction, the second part 152 being elongated and extending longitudinally in the first lateral direction.

The recessed portion or second part 152 includes a bottom portion 152a lower than the upper portion 151 of the cap plate, and four connection portions 152b connecting the bottom portion 152a and the top surface or first part 151. The bottom portion 152a may be convex in an outward direction. The bottom portion 152a may have a shape corresponding to the outer shape of the electrode assembly 110. The electrode assembly 110 may be approximately convex upward along the length direction of the cap plate 150, and accordingly, the bottom portion 152a may be approximately convex along the length direction of the cap plate 150.

The recessed portion 152 may be formed by placing the cap plate 150 on a jig (not shown) having a recess, and then pressing or stamping the cap plate 150 with a tool (not shown) having a protrusion. However, in the current embodiment, the method of forming the recessed portion 152 is not limited thereto.

The recessed portion 152 is lower than the upper portion 151 and is slightly lower than lower parts of the first and second terminals 120 and 130. That is, the bottom portion 152a of the recessed portion 152 may be slightly lower than the first collecting terminal 122 and the lower insulator 125 corresponding to the first collecting terminal 122, and the second collecting terminal 132 and the lower insulator 135 corresponding to the second collecting terminal 132. Therefore, if the secondary battery 101 (102) is dropped and impacted, the electrode assembly 110 may be brought into contact with the bottom portion 152a of the recessed portion 152 before contacting the first and second collecting terminals 122 and 132 and the lower insulators 125 and 135. Therefore, the electrode assembly 110 may be protected because impacts may be absorbed and dampened by the bottom portion 152a with a contact area that is wider than that of the first and second collecting terminals 122 and 132 and the lower insulators 125 and 135.

An electrolyte injection hole 153 may be formed through the upper portion 151, and a plug 154 may be coupled to the electrolyte injection hole 153. In addition, a safety vent 155 having a relatively thin thickness may be formed on the recessed portion 152 so that gas can be discharged through the safety vent 155 if the inside pressure of the case 140 increases above a predetermined level. Alternatively, the safety vent 155 may be formed on the narrow side 142 of the case 140 as in the secondary battery 102 shown in FIG. 1B. Alternatively, the safety vent 155 may be formed on the wide side 141 or bottom side 143 of the case 140. Alternatively, the electrolyte injection hole 153 and the plug 154 may be provided at the wide side 141, narrow side 142, or bottom side 143 of the case 140 instead of at the cap plate 150.

The cap plate 150 and the case 140 may be formed of the same material. The cap plate 150 may be formed of a conductive metal material such as aluminum, aluminum alloy, and steel plated with nickel. However, the material of the cap plate 150 is not limited thereto.

As described above, in the secondary battery 101 (102) of the current embodiment, the volume of a void inside the case 140 can be reduced by forming the recessed portion 152 on the cap plate 150 in a manner such that the recessed portion 152 is convex toward the electrode assembly 110. Therefore, although gas is abnormally generated in the secondary battery 101 (102), the secondary battery 101 (102) can be safely and reliably used because the safety vent 155 rapidly responds to the abnormal generation of gas.

In addition, since the recessed portion 152 has a shape corresponding to the outer shape of the electrode assembly 110, the recessed portion 152 can absorb impacts for the electrode assembly 110 when the secondary battery 101 (102) is dropped and impacted. That is, although the secondary battery 101 (102) is dropped and impacted, since the electrode assembly 110 is brought into contact with the relatively wide recessed portion 152 instead of the relatively sharp terminals 120 and 130 or lower insulators 125 and 135, the electrode assembly 110 can be less damaged.

Figure 2:
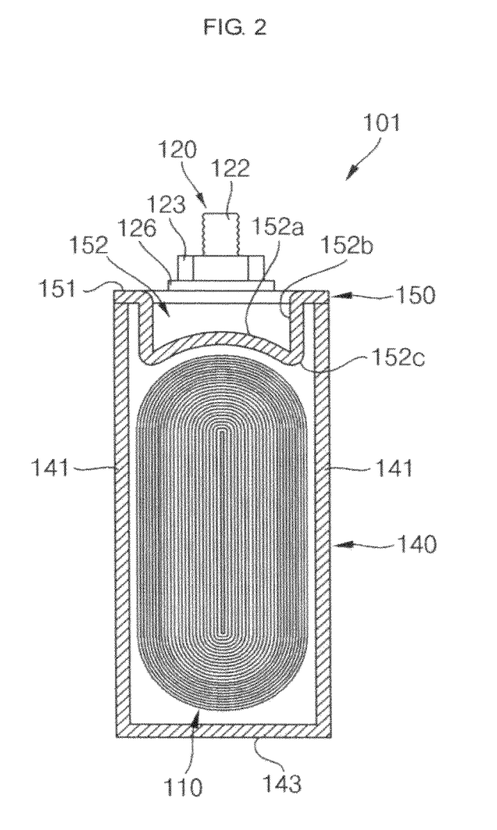
FIG. 2 illustrates a sectional view taken along line 2-2 of FIG. 1A.

FIG. 2 is a sectional view taken along line 2-2 of FIG. 1A.

As shown in FIG. 2, in the secondary battery 101 of the current embodiment, the cap plate 150 includes the upper portion 151 and the recessed portion 152. The recessed portion 152 is lower than the upper portion 151. The recessed portion 152 includes the bottom portion 152a, which bends convexly outward, and the connection portions 152b connecting the bottom portion 152a and the upper portion 151. Even the highest region of the bottom portion 152a is lower than the upper portion 151.

The bottom portion 152a may have a shape approximately corresponding to the convex outer portion of the electrode assembly 110, and the connection portions 152b may be approximately parallel with the wide sides 141 of the case 140. The upper part of the electrode assembly 110 may be approximately convex in the upward direction, and the bottom portion 152a, spaced apart from the electrode assembly 110, may be approximately convex in the same upward direction. Rounded portions 152c may be formed between the bottom portion 152a and the connection portions 152b. Therefore, is the electrode assembly 110 directly collides with the rounded portions 152c when the secondary battery 101 is dropped and impacted, breakage of the electrode assembly 110 may be avoided.

In addition, the bottom portion 152a and the electrode assembly 110 are spaced a predetermined distance from each other. That is, in general, the bottom portion 152a and the electrode assembly 110 do not contact each other but are spaced a predetermined distance from each other. Therefore, a gas passage may be provided so that gas can flow to the safety vent 155 in case of an abnormal situation. If the bottom portion 152a and the electrode assembly 110 were to contact each other in a normal operation state, a gas passage to the safety vent 155 may not be formed, and the electrode assembly 110 may be damaged due to continuous fine vibrations and friction with the recessed portion 152.

Therefore, in the secondary battery 101 of the current embodiment, the recessed portion 152 of the cap plate 150 is spaced apart from the electrode assembly 110 to ensure a gas passage to the safety vent 155. In addition, owing to the recessed portion 152, the volume of a void inside the case 140 can be reduced. Furthermore, if the secondary battery 101 is dropped and impacted, damage to the electrode assembly 110 can be minimized.

Figure 3:
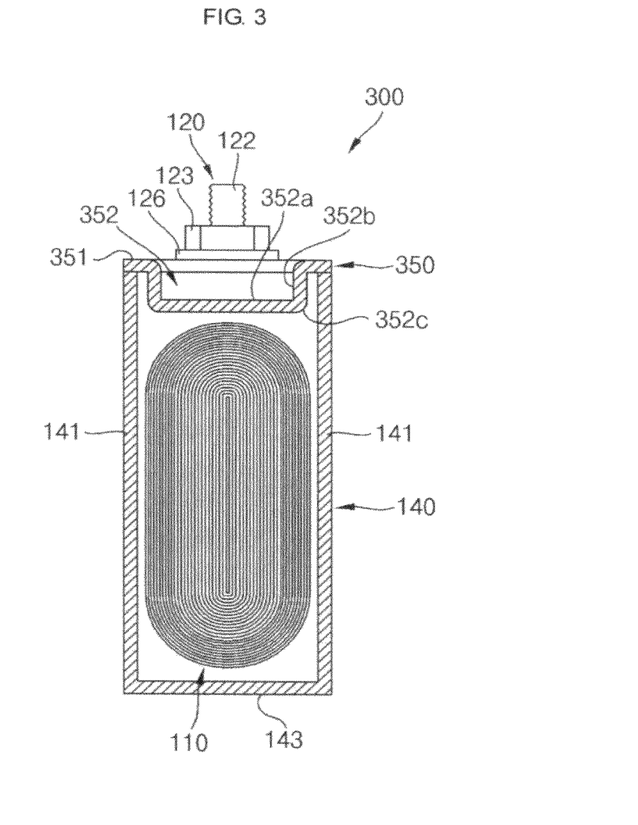
FIG. 3 illustrates a sectional view relating to a secondary battery according to another embodiment.

FIG. 3 is a sectional view illustrating a secondary battery 300 according to another embodiment.

As shown in FIG. 3, in the secondary battery 300 of the current embodiment, a cap plate 350 includes an upper portion 351 and a recessed portion 352. The upper portion 351 may include a planar top surface. The recessed portion 352 includes a bottom portion 352a, which is approximately planar, connection portions 352b connecting the bottom portion 352a and the upper portion 351, and rounded portions 352c formed between the bottom portion 352a and the connection portions 352b.

The bottom portion 352a may be approximately planar regardless of the shape of an upper part of an electrode assembly 110. That is, the bottom portion 352a may be approximately parallel with a bottom side 143 of a case 140.

The recessed portion 352 having the planar bottom portion 352a may be formed by a one-time pressing or stamping process. That is, the cap plate 350 may be manufactured through a simple manufacturing process as compared with the cap plate 150 of the above-described embodiment.

As described above, in the secondary battery 300 of the current embodiment, the volume of a void inside the case 140 can be reduced owing to the recessed portion 352 of the cap plate 350, and the electrode assembly 110 can be less damaged owing to the planar bottom portion 352a if the secondary battery 300 were to be dropped and impacted. In addition, the recessed portion 352 can be formed through a simple manufacturing process.

Figure 4:
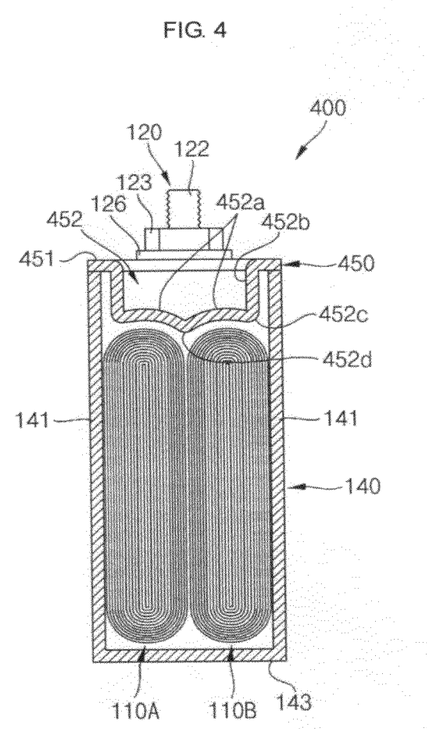
FIG. 4 illustrates a sectional view relating to a secondary battery according to another embodiment.

FIG. 4 is a sectional view illustrating a secondary battery 400 according to another embodiment.

As shown in FIG. 4, the secondary battery 400 of the current embodiment includes two electrode assemblies 110A and 110B. It is to be understood that in the current embodiment, the secondary battery 400 may include more than two electrode assemblies.

A cap plate 450 includes an upper portion 451 and a recessed portion 452. The recessed portion 452 includes a pair of bottom portions 452a which bend convexly outward, and connection portions 452b connecting the planar portion 451 and the bottom portions 452a. The bottom portions 452a have shapes approximately corresponding to the upper parts of the electrode assemblies 110A and 110B, and the connection portions 452b are approximately parallel with wide sides 141 of a case 140. In the other words, the upper parts of the pair of electrode assemblies 110A and 110B are approximately convex in the upward direction, and the pair of bottom portions 452a are spaced apart from the pair of electrode assemblies 110A and 110B and are approximately convex in the upward direction. In addition, rounded portions 452c are formed between the bottom portions 452a and the connection portions 452b, and a rounded portion 452d is formed at a center lower end of the bottom portions 452a. The rounded portion 452d may extend downwardly towards a cleft between the convex upper portions of the electrode assembly units 110A, 110B.

Therefore, even if the electrode assemblies 110A and 110B are brought into contact with the round portions 452c and 452d when the secondary battery 400 is dropped and impacted, damage to the electrode assemblies 110A and 110B may minimized.

As described above, in the secondary battery 400 of the current embodiment, owing to the recessed portion 452 of the cap plate 450, the volume of a void inside the case 140 can be reduced, and damage to the electrode assemblies 110A and 110B can be minimized if the secondary battery 400 is dropped and impacted.

Figure 5:
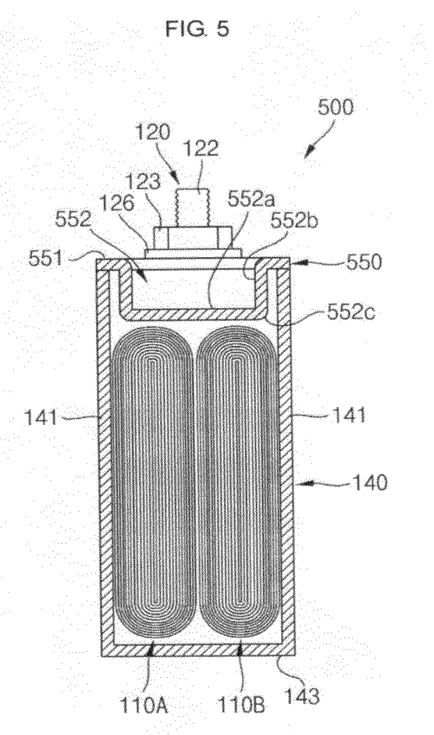
FIG. 5 illustrates a sectional view relating to a secondary battery according to another embodiment.

FIG. 5 is a sectional view illustrating a secondary battery 500 according to another embodiment.

As shown in FIG. 5, in the secondary battery 500 of the current embodiment, a cap plate 550 includes a upper portion 551 and a recessed portion 552. The recessed portion 552 includes a bottom portion 552a which is approximately planar, and connection portions 552b connecting the bottom portion 552a and the upper portion 551. The bottom portion 552a is approximately planar regardless of the shapes of upper parts of a pair of electrode assemblies 110A and 110B. That is, the bottom portion 552a is approximately parallel with a bottom side 143 of a case 140. Rounded portions 552c are formed between the bottom portion 552a and the connection portions 552b. Therefore, if the electrode assemblies 110A and 110B are brought into contact with the round portions 552c when the secondary battery 500 is dropped and impacted, damage to the electrode assemblies 110A and 110B may be minimized.

As described above, in the secondary battery 500 of the current embodiment, the volume of a void inside the case 140 can be reduced owing to the recessed portion 552 of the cap plate 550, and the electrode assemblies 110A and 110B can be less damaged owing to the planar bottom portion 552a if the secondary battery 500 is dropped and impacted.

Figure 6:
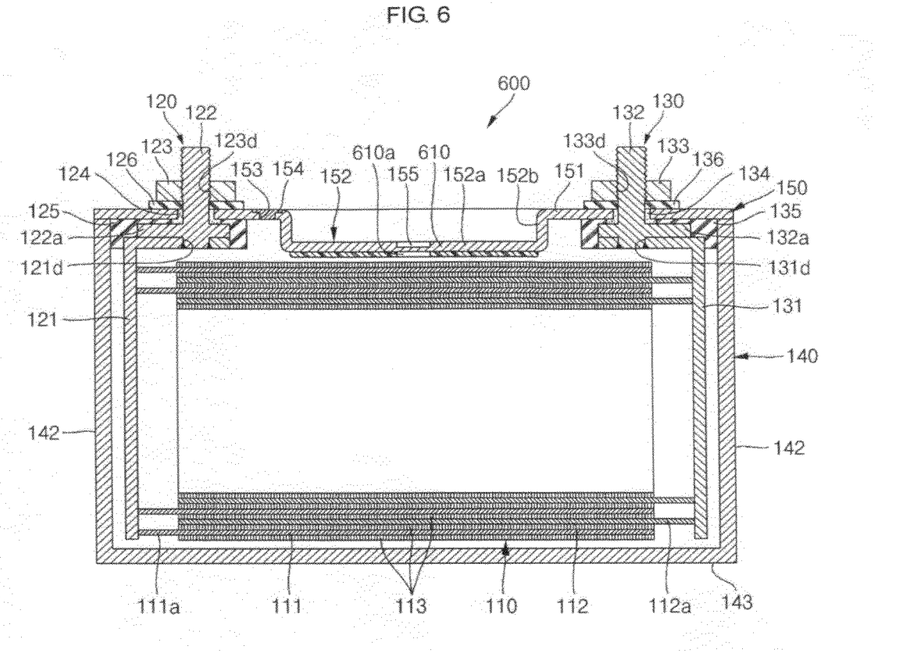
FIG. 6 illustrates a sectional view relating to a secondary battery according to another embodiment.

FIG. 6 is a sectional view illustrating a secondary battery 600 according to another embodiment.

As shown in FIG. 6, in the secondary battery 600 of the current embodiment, an impact damper 610 may be further disposed between a recessed portion 152 of a cap plate 150 and an electrode assembly 110. The impact damper 610 having a predetermined thickness may be coated on or attached to the bottom surface of a bottom portion 152a of the recessed portion 152. If a safety vent 155 is formed on the bottom portion 152a, a hole 610a having a predetermined diameter may be formed in the impact damper 610 at a position corresponding to the safety vent 155. The impact damper 610 is spaced apart from the electrode assembly 110 so that a degassing passage can be formed and continuous friction between the impact damper 610 and the electrode assembly 110 can be prevented.

The impact damper 610 may include an elastomer that has the properties of rubber and does not react with electrolyte. For example, the impact damper 610 may be formed of a resin including perfluoroalkoxy (PFA), polypropylene (PP), or polyethylene (PE), which do not react with electrolytes. However, the current embodiment is not limited thereto.

As described above, in the secondary battery 600 of the current embodiment, owing to the recessed portion 152, the volume of a void inside the case 140 can be reduced, and the electrode assembly 110 can be less damaged owing to the impact damper 610 if the secondary battery 600 is dropped and impacted. That is, when the secondary battery 600 is dropped and impacted, the electrode assembly 110 may be brought into contact with the impact damper 610 formed of a soft material instead of being brought into contact with the metallic recessed portion 152.

Figure 7:
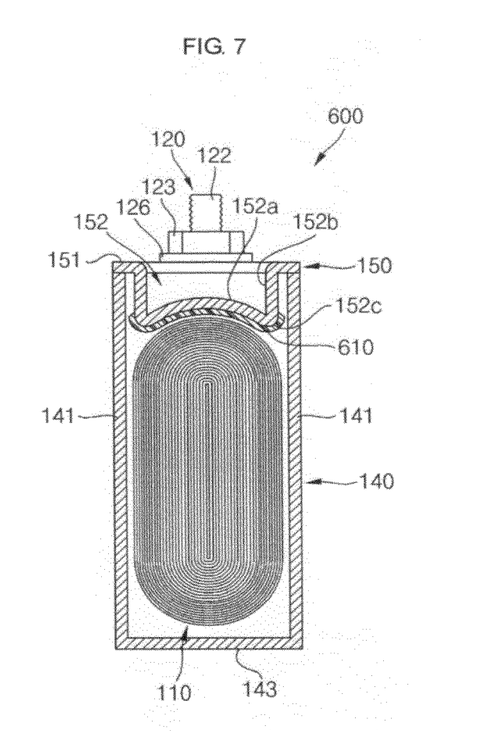
FIG. 7 illustrates a sectional view relating to a secondary battery according to another embodiment.

FIG. 7 is a sectional view illustrating a secondary battery 600 according to another embodiment.

As shown in FIG. 7, in the secondary battery 600 of the current embodiment, an impact damper 610 having a predetermined thickness is formed on the bottom surface of a bottom portion 152a of a recessed portion 152 of a cap plate 150. The impact damper 610 is spaced a predetermined distance from an electrode assembly 110. The bottom portion 152a may bend convexly upward, and the impact damper 610 formed on the bottom portion 152a may extend to cover rounded portions 152c disposed at both sides of the bottom portion 152a. The impact damper 610 may be formed of the same material as described above, and thus a description thereof will not be repeated.

As described above, in the secondary battery 600 of the current embodiment, the volume of a void inside a case 140 can be reduced owing to the recessed portion 152. In addition, if the secondary battery 600 is dropped and impacted, the electrode assembly 110 can be less damaged owing to the impact damper 610 formed on the bottom surfaces of the bottom portion 152a and the round portions 152c of the recessed portion 152.

Figure 8:
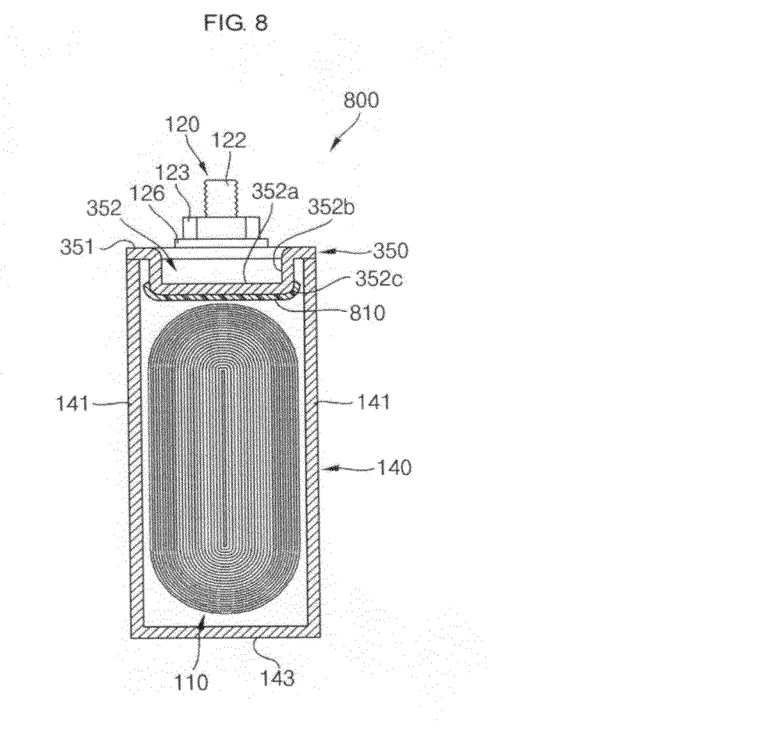
FIG. 8 illustrates a sectional view relating to a secondary battery according to another embodiment.

FIG. 8 is a sectional view illustrating a secondary battery 800 according to another embodiment.

As shown in FIG. 8, in the secondary battery 600 of the current embodiment, a bottom portion 352a of a recessed portion 352 is approximately planar, and an impact damper 810 having a predetermined thickness is formed on the bottom surface of the bottom portion 352a. In addition, the impact damper 810 may extend to rounded portions 352c disposed at both sides of the bottom portion 352a.

Figure 9:
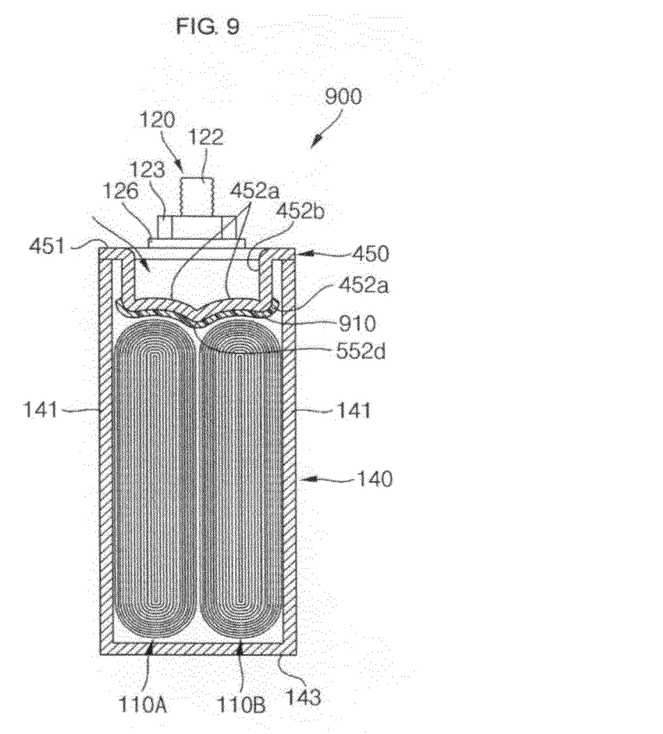
FIG. 9 illustrates a sectional view relating to a secondary battery according to another embodiment.

FIG. 9 is a sectional view illustrating a secondary battery 900 according to another embodiment.

As shown in FIG. 9, in the secondary battery 900 of the current embodiment, a recessed portion 452 includes a pair of bottom portions 452a, which are approximately convex in an upward direction, and rounded portions 452b and 452c formed at the center and both sides of the recessed portion 452. An impact damper 910 may be formed on the bottom portions 452a and the rounded portions 452b and 452c.

Figure 10:
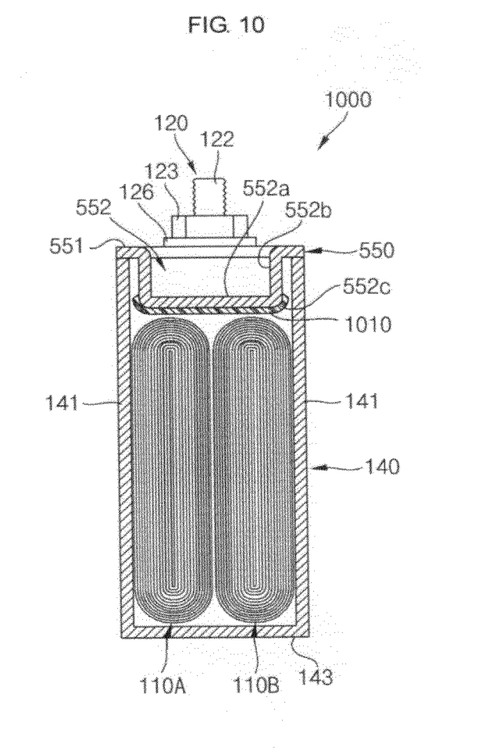
FIG. 10 illustrates a sectional view relating to a secondary battery according to another embodiment.

FIG. 10 is a sectional view illustrating a secondary battery 1000 according to another embodiment.

As shown in FIG. 10, in the secondary battery 1000 of the current embodiment, a recessed portion 552 includes a bottom portion 552a, which is approximately planar and disposed above a pair of electrode assemblies 110A and 110B, and an impact damper 1010 is formed on the bottom surface of the bottom portion 552a. The impact damper 1010 covers rounded portions 552c disposed at both sides of the bottom portion 552a.

According to the embodiments, the recessed portion may be formed on the cap plate in a direction toward the electrode assembly. Therefore, the volume of a void of the secondary battery can be reduced. Owing to the reduced void volume of the secondary battery, if gas is abnormally generated in the secondary battery, the safety vent can be rapidly opened so that the secondary battery can be safely and reliably used.

According to the embodiments, the recessed portion may be formed on the cap plate in a direction toward the electrode assembly. Therefore, the electrode assembly may be less damaged if the secondary battery is dropped and impacted. That is, if the secondary battery is dropped and impacted, contact between the electrode assembly and sharp regions of the terminals may be avoided. Instead, the electrode assembly may be brought into contact with the relatively wide recessed portion, and thus the impact can be absorbed and reduced. Therefore, the electrode assembly can be less damaged, and the secondary battery can be safely and reliably used for a long time.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly;
a case accommodating the electrode assembly;
a cap plate sealing an opening in the case; and electrode terminals extending through the cap plate at opposite ends of the cap plate, the cap plate including a recessed portion extending in one direction between the electrode terminals, the electrode terminals including a first terminal that includes a first collecting plate that contacts an end of the electrode assembly and a first collecting terminal that extends downwardly from a non-recessed portion of the cap plate to contact the first collecting plate, the first collecting terminal being disposed entirely above the electrode assembly, a bottom portion of the recessed portion of the cap plate being spaced from the non-recessed portion of the cap plate by a greater distance than a distance that the first collecting terminal extends downwardly from the non-recessed portion of the cap plate.

2. The rechargeable battery as claimed in claim 1, wherein the recessed portion extends from a top surface of the cap plate toward the electrode assembly.

3. The rechargeable battery as claimed in claim 1, wherein the cap plate has a planar area, more than half of the planar area being occupied by the recessed portion.

4. The rechargeable battery as claimed in claim 2, wherein the recessed portion includes connection portions connecting the bottom portion of the recessed portion to the top surface of the cap plate.

5. The rechargeable battery as claimed in claim 4, wherein the recessed portion further includes rounded portions between the bottom portion and the connection portions.

6. The rechargeable battery as claimed in claim 4, wherein the electrode assembly includes a convex outer portion that faces the cap plate.

7. The rechargeable battery as claimed in claim 6, wherein the bottom portion of the recessed portion of the cap plate is planar.

8. The rechargeable battery as claimed in claim 6, wherein the bottom portion of the recessed portion of the cap plate has a convex shape corresponding in shape to the convex outer portion of the electrode assembly.

9. The rechargeable battery as claimed in claim 4, wherein the bottom portion of the recessed portion of the cap plate includes a safety vent.

10. The rechargeable battery as claimed in claim 1, further including an impact damper between the recessed portion of the cap plate and the electrode assembly, wherein the impact damper is attached to a surface of the recessed portion of the cap plate facing the electrode assembly.

11. The rechargeable battery as claimed in claim 10, wherein the impact damper includes an elastomer.

12. The rechargeable battery as claimed in claim 10, wherein the impact damper includes perfluoroalkoxy (PFA), polypropylene (PP), or polyethylene (PE).

13. The rechargeable battery as claimed in claim 4, wherein the electrode assembly includes two or more electrode assembly units, each electrode assembly unit including a convex outer portion facing the cap plate.

14. The rechargeable battery as claimed in claim 13, wherein the bottom portion of the recessed portion of the cap plate is planar.

15. The rechargeable battery as claimed in claim 13, wherein:
the bottom portion of the recessed portion of the cap plate includes two or more convex portions, each convex portion corresponding in shape to one of the convex outer portions of the electrode assembly units, and
the bottom portion of the recessed portion of the cap plate further includes a rounded protrusion extending downwardly from each convex portion and towards a cleft between the convex outer portions of the electrode assembly units.

16. A rechargeable battery comprising:
a case having a pair of oppositely disposed wide sides, oppositely disposed narrow sides, a top side, and a bottom side opposite to the top side, the wide sides extending longitudinally in a first lateral direction between the narrow sides;
an electrode assembly in the case;
a cap plate at the top side of the case, the cap plate including a first part disposed in a plane of the top side of the case and a second part spaced from the first part toward the electrode assembly in a second direction perpendicular to the first lateral direction, the second part being elongated and extending longitudinally in the first lateral direction; and
a first terminal, the first terminal including a first collecting plate that contacts an end of the electrode assembly and a first collecting terminal that extends downwardly from the first part of the cap plate to contact the first collecting plate, the first collecting terminal being disposed entirely above the electrode assembly, a bottom portion of the second part of the cap plate being spaced from the first part of the cap plate by a greater distance than a distance that the first collecting terminal extends downwardly from the first part of the cap plate.

17. The rechargeable battery as claimed in claim 16, further including a second terminal spaced in the first lateral direction from the first terminal, the second part being between the first terminal and the second terminal.

\* \* \* \* \*